United States Patent
Nishio et al.

(10) Patent No.: US 10,690,932 B2
(45) Date of Patent: Jun. 23, 2020

(54) LIGHTING DEVICE

(71) Applicant: Dai Nippon Printing Co., Ltd., Tokyo (JP)

(72) Inventors: Shumpei Nishio, Tokyo (JP); Makio Kurashige, Tokyo (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 0 days.

(21) Appl. No.: 16/078,833

(22) PCT Filed: Feb. 20, 2017

(86) PCT No.: PCT/JP2017/006068
§ 371 (c)(1),
(2) Date: Aug. 22, 2018

(87) PCT Pub. No.: WO2017/145972
PCT Pub. Date: Aug. 31, 2017

(65) Prior Publication Data
US 2019/0072776 A1     Mar. 7, 2019

(30) Foreign Application Priority Data

Feb. 24, 2016   (JP) ................................ 2016-033224
Jul. 27, 2016   (JP) ................................ 2016-147678
Dec. 22, 2016   (JP) ................................ 2016-249894

(51) Int. Cl.
*G02B 27/42* (2006.01)
*F21V 5/00* (2018.01)
(Continued)

(52) U.S. Cl.
CPC ............ *G02B 27/425* (2013.01); *F21S 41/16* (2018.01); *F21S 41/285* (2018.01); *F21V 5/003* (2013.01);
(Continued)

(58) Field of Classification Search
CPC .............. G02B 27/425; G02B 27/0955; G02B 27/0944; G02B 5/32; G02B 5/0252;
(Continued)

(56) References Cited

U.S. PATENT DOCUMENTS

| | | |
|---|---|---|
| 5,186,533 A | 2/1993 | Hori |
| 2008/0225361 A1* | 9/2008 | Kasazumi .......... G02B 27/1053 359/15 |
| 2010/0097674 A1 | 4/2010 | Kasazumi et al. |

FOREIGN PATENT DOCUMENTS

| | | |
|---|---|---|
| CN | 1914556 A | 2/2007 |
| DE | 29920151 U1 | 5/2001 |

(Continued)

OTHER PUBLICATIONS

English translation of International Preliminary Report on Patentability (Chapter I) (Application No. PCT/JP2017/006068) dated Sep. 7, 2018, 29 pages.

(Continued)

*Primary Examiner* — Joseph L Williams
*Assistant Examiner* — Jose M Diaz
(74) *Attorney, Agent, or Firm* — Burr & Brown, PLLC

(57) ABSTRACT

Provided is a lighting device capable of safely illuminating a region to be illuminated having a first direction while making its edge sharp. A lighting device illuminates a region to be illuminated extending in a first direction and extending in a second direction intersecting with the first direction. The lighting device includes a light source and a diffractive optical element having a first hologram component and a second hologram component both of which diffract light from the light source and direct the light to the region to be illuminated, wherein the diffracted light from the first hologram component illuminates the entire region of the region to be illuminated and the diffracted light from the second (Continued)

hologram component illuminates the entire region of the region to be illuminated.

15 Claims, 9 Drawing Sheets

(51) Int. Cl.

| | | |
|---|---|---|
| *F21S 41/16* | (2018.01) | |
| *F21S 41/20* | (2018.01) | |
| *G03H 1/30* | (2006.01) | |
| *G03H 1/26* | (2006.01) | |
| *G03H 1/32* | (2006.01) | |
| *G02B 5/02* | (2006.01) | |
| *G02B 27/09* | (2006.01) | |
| *G02B 5/32* | (2006.01) | |
| *G03H 1/22* | (2006.01) | |
| *G03H 1/02* | (2006.01) | |
| *G03H 1/08* | (2006.01) | |

(52) U.S. Cl.
CPC ............ *G02B 5/0252* (2013.01); *G02B 5/32* (2013.01); *G02B 27/0944* (2013.01); *G02B 27/0955* (2013.01); *G03H 1/265* (2013.01); *G03H 1/30* (2013.01); *G03H 1/32* (2013.01); *G03H 1/0808* (2013.01); *G03H 2001/0212* (2013.01); *G03H 2001/0216* (2013.01); *G03H 2001/2215* (2013.01); *G03H 2001/266* (2013.01); *G03H 2210/20* (2013.01); *G03H 2222/12* (2013.01); *G03H 2222/20* (2013.01)

(58) Field of Classification Search
CPC ............ G03H 1/32; G03H 1/30; G03H 1/265; G03H 1/0808; G03H 2222/20; G03H 2001/2215; G03H 2001/266; G03H 2001/0261; G03H 2001/0212; G03H 2222/12; G03H 2210/20; F21S 41/16; F21S 41/285; F21V 5/003
See application file for complete search history.

(56) References Cited

FOREIGN PATENT DOCUMENTS

| | | |
|---|---|---|
| JP | 2003-270585 A1 | 9/2003 |
| JP | 2004-184821 A1 | 7/2004 |
| JP | 2015-132707 A1 | 7/2015 |
| WO | 2005/073798 A1 | 8/2005 |
| WO | 2012/033174 A1 | 3/2012 |
| WO | 2012/034174 A1 | 3/2012 |
| WO | 2012/141254 A1 | 10/2012 |

OTHER PUBLICATIONS

International Search Report and Written Opinion (Application No. PCT/JP2017/006068) dated May 23, 2017.
Supplementary European Search Report from a corresponding European patent application (EP 17756410.1) dated Jul. 18, 2019, 9 pages.
Chinese Office Action (Application No. 201780012675.X) dated Nov. 27, 2019 (with English translation).

* cited by examiner

LIGHTING DEVICE

BACKGROUND OF THE INVENTION

1. Field of the Invention

The present disclosure relates to a lighting device that illuminates a region to be illuminated having a longitudinal direction.

2. Description of Related Art

For example, as disclosed in JP 2015-132707 A, a lighting device including a light source and a hologram component is known. In the lighting device disclosed in JP2015-132707 A, the hologram component diffracts light from the light source, so that the road surface can be illuminated in a desired pattern. In the lighting device disclosed in JP2015-132707 A, a laser beam generated by a single light source is diffracted by a single hologram component.

However, in JP2015-132707 A, no consideration has been made on contrivances for suppressing unclearness of the region to be illuminated, that is, the edge of the region to be illuminated. The sharpness of the edge of the region to be illuminated is more noticeable when illuminating a region to be illuminated having a longitudinal direction, in particular, when illuminating a line-shaped region to be illuminated. In addition, when illuminating the region to be illuminated using a plurality of light sources in the same wavelength region or different wavelength regions, the edge of the region to be illuminated tends to be more blurred.

Furthermore, when a light source that emits a laser beam is used, the region to be illuminated can be brightly illuminated. On the other hand, however, there is a possibility that the eyes of a person may be adversely affected when looking directly at the illumination light from the lighting device.

SUMMARY OF THE INVENTION

The present disclosure has been made in view of the above points, and an object thereof is to provide a lighting device capable of safely illuminating a region to be illuminated having a longitudinal direction while sharpening its edge.

According to one aspect of the present disclosure, there is provided a lighting device that illuminates a region to be illuminated extending in a first direction and extending in a second direction intersecting with the first direction, wherein the lighting device includes a light source, and a diffractive optical element having a first hologram component and a second hologram component both of which diffract light from the light source and direct the light to the region to be illuminated, wherein the diffracted light from the first hologram component illuminates an entire region of the region to be illuminated and the diffracted light from the second hologram component illuminates the entire region of the region to be illuminated.

An illumination width along a second direction intersecting with the first direction of diffracted light from the first hologram component incident on an optional position along the first direction of the region to be illuminated may be identical to an illumination width along the second direction of diffracted light from the second hologram component incident on the optional position along the first direction of the region to be illuminated.

An illumination length along the first direction of the diffracted light from the first hologram component incident on an optional position along the second direction intersecting with the first direction of the region to be illuminated may be identical to an illumination length along the first direction of diffracted light from the second hologram component incident on the optional position along the second direction of the region to be illuminated.

According to another aspect of the present disclosure, there is provided a lighting device that illuminates a region to be illuminated extending in a first direction and extending in a second direction intersecting with the first direction, wherein the lighting device includes a light source, and a diffractive optical element having a first hologram component and a second hologram component both of which diffract light from the light source and direct the light to the region to be illuminated, wherein an illumination range of diffracted light from the first hologram component is aligned with an illumination range of diffracted light from the second hologram component in at least one of the first direction and the second direction of the region to be illuminated.

The first hologram component and the second hologram component may be disposed in a direction intersecting with the first direction of the region to be illuminated and in a direction intersecting with a normal direction to a plane on which the region to be illuminated is formed, wherein an illumination width along a second direction intersecting with the first direction of diffracted light from the first hologram component incident on an optional position along the first direction of the region to be illuminated may be identical to an illumination width along the second direction of diffracted light from the second hologram component incident on the optional position along the first direction of the region to be illuminated.

The first hologram component and the second hologram component may be disposed in a direction intersecting with the first direction of the region to be illuminated and in a direction along a normal direction to a plane on which the region to be illuminated is formed, wherein an illumination length along the first direction of the diffracted light from the first hologram component incident on an optional position along the second direction intersecting with the first direction of the region to be illuminated may be identical to an illumination length along the first direction of diffracted light from the second hologram component incident on the optional position along the second direction of the region to be illuminated, wherein an illumination width along a second direction of diffracted light from the first hologram component incident on an optional position along the first direction of the region to be illuminated may be identical to an illumination width along the second direction of diffracted light from the second hologram component incident on the optional position along the first direction of the region to be illuminated.

The first hologram component may include a plurality of element holograms, wherein diffracted light from at least two or more element holograms among the plurality of element holograms may illuminate the entire region of the region to be illuminated.

The second hologram component may include a plurality of element holograms, wherein diffracted light from at least two or more element holograms among the plurality of element holograms may illuminate the entire region of the region to be illuminated.

An illumination width along a second direction intersecting with the first direction of diffracted light from one element hologram incident on an optional position along the first direction of the region to be illuminated may be identical to an illumination width along the second direction of diffracted light from another element hologram incident on the optional position along the first direction of the region to be illuminated.

An illumination length along the first direction of diffracted light from one element hologram incident on an optional position along a second direction intersecting with the first direction of the region to be illuminated may be identical to an illumination length along the first direction of diffracted light from another element hologram component incident on the optional position along the second direction of the region to be illuminated.

The plurality of element holograms may be disposed in a direction intersecting with the first direction of the region to be illuminated and in a direction intersecting with a normal direction to a plane on which the region to be illuminated is formed, wherein an illumination width along a second direction intersecting with the first direction of diffracted light from one element hologram incident on an optional position along the first direction of the region to be illuminated may be identical to an illumination width along the second direction of diffracted light from another element hologram incident on the optional position along the first direction of the region to be illuminated.

The plurality of element hologram may be disposed in a direction intersecting with the first direction of the region to be illuminated and in a direction along a normal direction to a plane on which the region to be illuminated is formed, wherein an illumination length along the first direction of the diffracted light from one element hologram incident on an optional position along the second direction intersecting with the first direction of the region to be illuminated may be identical to an illumination length along the first direction of diffracted light from another element hologram incident on the optional position along the second direction of the region to be illuminated, wherein an illumination width along a second direction of diffracted light from one element hologram incident on an optional position along the first direction of the region to be illuminated may be identical to an illumination width along the second direction of diffracted light from another element hologram incident on the optional position along the first direction of the region to be illuminated.

The light source may include a first coherent light source and a second coherent light source, wherein the lighting device may further include a first shaping optical system for shaping light from the first coherent light source to direct the light to the first hologram component, and a second shaping optical system for shaping light from the second coherent light source to direct the light to the second hologram component.

According to another aspect of the present disclosure, there is provided a lighting device that illuminates a region to be illuminated having a first direction, wherein the lighting device includes a light source, and a diffractive optical element having a hologram component which diffracts light from the light source and directs the light to the region to be illuminated, wherein the hologram component includes a plurality of element holograms, wherein diffracted light from at least two or more element holograms among the plurality of element holograms illuminates an entire region of the region to be illuminated.

The light source may include a light emitting portion having a long axis direction and a short axis direction intersecting with the long axis direction, wherein the lighting device may further include a shaping optical system for shaping light spreading in the short axis direction from the light emitting portion so that the light spreads in a second direction intersecting with the first direction by the hologram component.

According to another aspect of the present disclosure, there is provided a lighting device that illuminates a region to be illuminated having a first direction, wherein the lighting device includes a light source including a light emitting portion having a long axis direction and a short axis direction intersecting with the long axis direction and emitting coherent light, and a diffractive optical element having a hologram component which diffracts the coherent light from the light source and directs the coherent light to the region to be illuminated, wherein the coherent light spreading from the light emitting portion in the short axis direction is shaped to spread in a second direction intersecting with the first direction by the hologram component.

The lighting device may further include a shaping optical system for shaping coherent light from the light source to direct the coherent light to the hologram component, wherein after the coherent light spreading from the light emitting portion in the short axis direction is shaped by the shaping optical system, the coherent light may be shaped to spread in the second direction by the hologram component.

The shaping optical system may include a collimating lens that shapes coherent light from the light source into parallel light.

The short axis direction may be parallel to the second direction.

The diffractive optical element may illuminate the region to be illuminated so that a center line extending in the first direction through a center position in a second direction intersecting with the first direction of the region to be illuminated, and a projection line projecting an illumination light beam extending in the first direction through the center position of the diffractive optical element onto the region to be illuminated are shifted.

Light emitted from the light source may be coherent light, wherein the diffractive optical element may illuminate the region to be illuminated so that zeroth-order light which has transmitted through the diffractive optical element without being diffracted by the diffractive optical element among the coherent light incident on the diffractive optical element is incident on a farthest end rather than a nearest end in the first direction of the region to be illuminated.

Light emitted from the light source and incident on the diffractive optical element may be diffused light spreading more than parallel light.

According to the present disclosure, it is possible to safely illuminate a region to be illuminated having a longitudinal direction while sharpening its edge.

BRIEF DESCRIPTION OF DRAWINGS

FIG. 2 shows a hologram component from the longitudinal direction of the region to be illuminated.

FIG. 3 shows the hologram component from the longitudinal direction of a region to be illuminated.

DETAILED DESCRIPTION OF THE INVENTION

Figure 1:
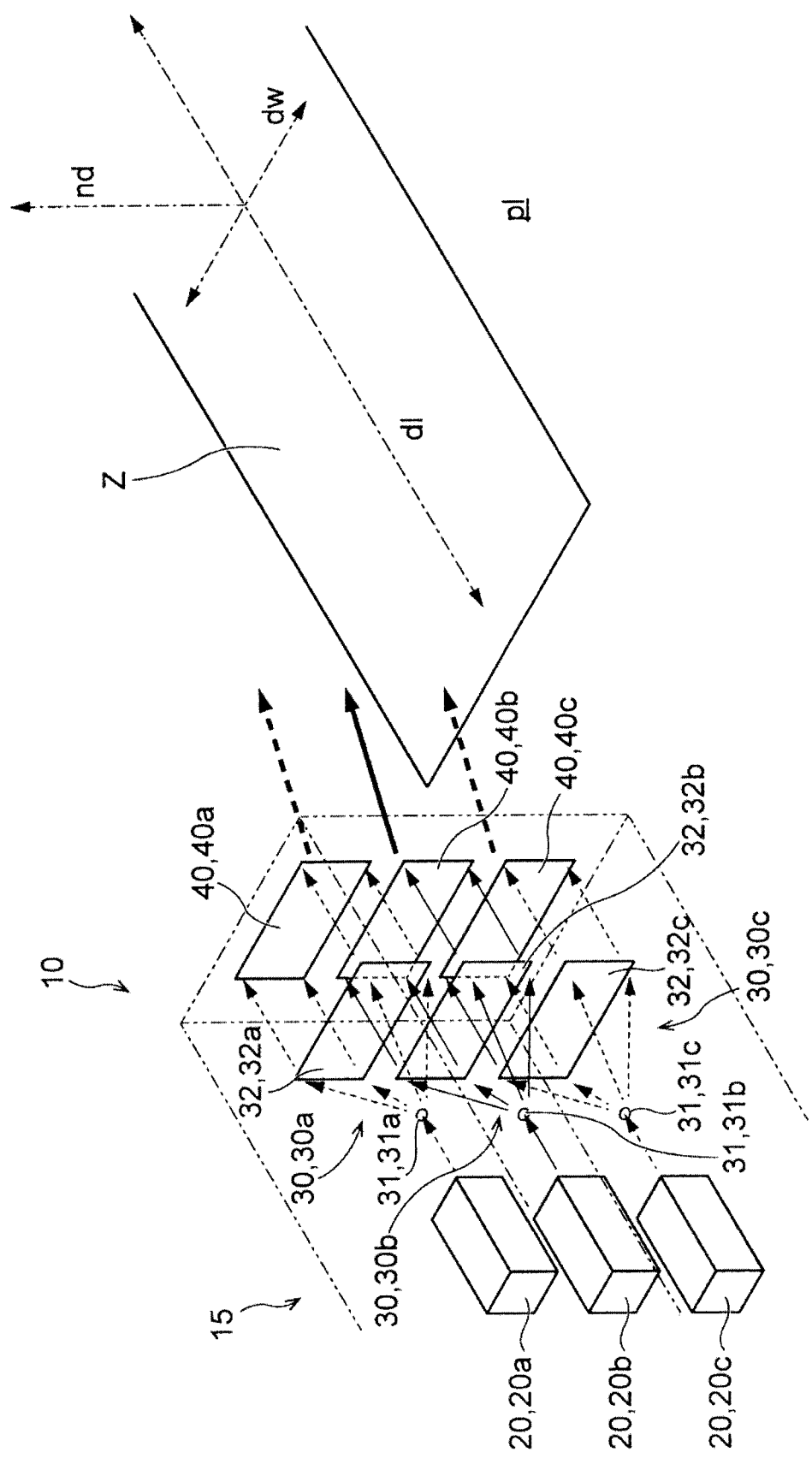
FIG. 1 is a diagram for explaining an embodiment according to the present disclosure, and is a perspective view of a lighting device.

Hereinafter, an embodiment of the present disclosure will be described with reference to the drawings. In the drawings attached to the present specification, for convenience of ease of understanding and ease of illustration, scale ratios, longitudinal and lateral dimensional ratios and the like are exaggerated by changing from the actual ones.

In addition, terms such as "parallel", "orthogonal", "identical" and the like, values of length and angle, etc. which specify shapes and geometrical conditions and their degrees to be used in this specification are not bound by strict meaning, and are interpreted including a range that can expect similar functions.

FIG. 1 is a perspective view schematically showing the overall configuration of a lighting device 10. The lighting device 10 illuminates a region to be illuminated Z extending in a first direction and extending in a second direction intersecting with the first direction. Although the shape and size of the region to be illuminated Z are optional, typically, the lighting device 10 is a device that illuminates the region to be illuminated Z having a longitudinal direction, for example, a region to be illuminated Z where the ratio of the transverse direction to the longitudinal direction is 10 or more, furthermore, a region to be illuminated Z where this ratio is 100 or more, or typically, a line-shaped region to be illuminated z. This lighting device can be applied to, for example, a vehicle such as an automobile or a ship. In vehicles, it is necessary to illuminate the region spreading forward in the direction of travel. In particular, it is preferable that a front lamp of an automobile that runs at high speed, so-called a headlamp, illuminate brightly the road surface from the vicinity of the front of the automobile to the far ahead. Also, in a light for search called a search light, it is sometimes required to illuminate brightly only an elongated region extending forward. In the lighting device 10 described here, measures are taken to make it possible to illuminate safely the region to be illuminated Z having a longitudinal direction dl, in particular, the region to be illuminated Z located in front of the lighting device 10 and having the longitudinal direction dl in a direction away from the lighting device 10, while making its edge sharp. Therefore, in application to a front lamp or a search light, without illuminating regions where illumination is not appropriate, for example, the oncoming lane, it is possible to sharply illuminate only the inside of the predetermined range including the edge. Further, by combining with image analysis by a computer, it is also possible to detect foreign matter, a suspicious object, and the like existing in the region to be illuminated Z with high accuracy.

As shown in FIG. 1, the lighting device 10 includes a light source device 15 that projects light and a hologram component 40 that diffracts light from the light source device 15 and directs the light to the region to be illuminated Z. The light source device 15 includes a light source 20 and a shaping optical system 30 that shapes the light emitted from the light source 20.

In the example shown in FIG. 1, the light source device 15 has a plurality of light sources 20. As the light source 20, a laser beam source that oscillates laser beam can be used. The laser beam projected from the laser beam source is excellent in rectilinear property, and is suitable as light for highly accurately illuminating the region to be illuminated Z. The plurality of light sources 20 may be provided separately or may be a light source module in which the plurality of light sources 20 is disposed side by side on a common substrate. As one example, the plurality of light sources 20 includes a first laser beam source 20a that oscillates light in a red emission wavelength region, a second laser beam source 20b that oscillates light in a green emission wavelength region, and a third laser beam source 20c that oscillates light in a blue emission wavelength region. According to this example, by overlapping the three laser beams emitted from the plurality of light sources 20, it is possible to generate illumination light of various colors including white illumination light. However, the light source device 15 is not limited to this example, and the light source device 15 may have two light sources 20, or four or more light sources 20, which have different emission wavelength regions. In order to increase the light emission intensity, a plurality of light sources 20 may be provided for each emission wavelength region.

Next, the shaping optical system 30 will be described. The shaping optical system 30 shapes the laser beam emitted from the light source 20. In other words, the shaping optical system 30 shapes the shape in the cross section orthogonal to the optical axis of the laser beam and the three-dimensional shape of the light flux of the laser beam. In the illustrated example, the shaping optical system 30 shapes the laser beam emitted from the light source 20 into a broadened parallel light flux. As shown in FIG. 1, the shaping optical system 30 has a lens 31 and a collimating lens 32 in the order along the optical path of the laser beam. The lens 31 shapes the laser beam emitted from the light source 20 into a divergent light flux. The collimating lens 32 reshapes the divergent light flux generated by the lens 31 into a parallel light flux.

In the illustrated example, the light source device 15 has a first shaping optical system 30a, a second shaping optical system 30b, and a third shaping optical system 30c corresponding to the first to the third laser beam source 20c, respectively. The first shaping optical system 30a has a first lens 31a and a first collimating lens 32a, the second shaping optical system 30b has a second lens 31b and a second collimating lens 32b, and the third shaping optical system 30c has a third lens 31c and a third collimating lens 32c.

Next, the hologram component 40 will be described. The hologram component 40 is a diffractive optical element that diffracts light from the light source device 15 and directs it to the region to be illuminated Z. Therefore, the region to be illuminated Z is illuminated by diffracted light from the hologram component 40.

In the illustrated example, the lighting device 10 has a plurality of hologram components 40. More specifically, the lighting device 10 includes a first hologram component 40a, a second hologram component 40b, and a third hologram component 40c. Each of the hologram components 40a, 40b, and 40c is provided corresponding to each of the laser beam sources 20a, 20b, and 20c which oscillate laser beams. According to this example, even when the laser beam sources 20a, 20b, and 20c oscillate laser beam in different wavelength regions, each of the hologram components 40a, 40b, and 40c can diffract laser beams of different wavelength regions generated by the corresponding laser beams with high efficiency.

Figure 2:
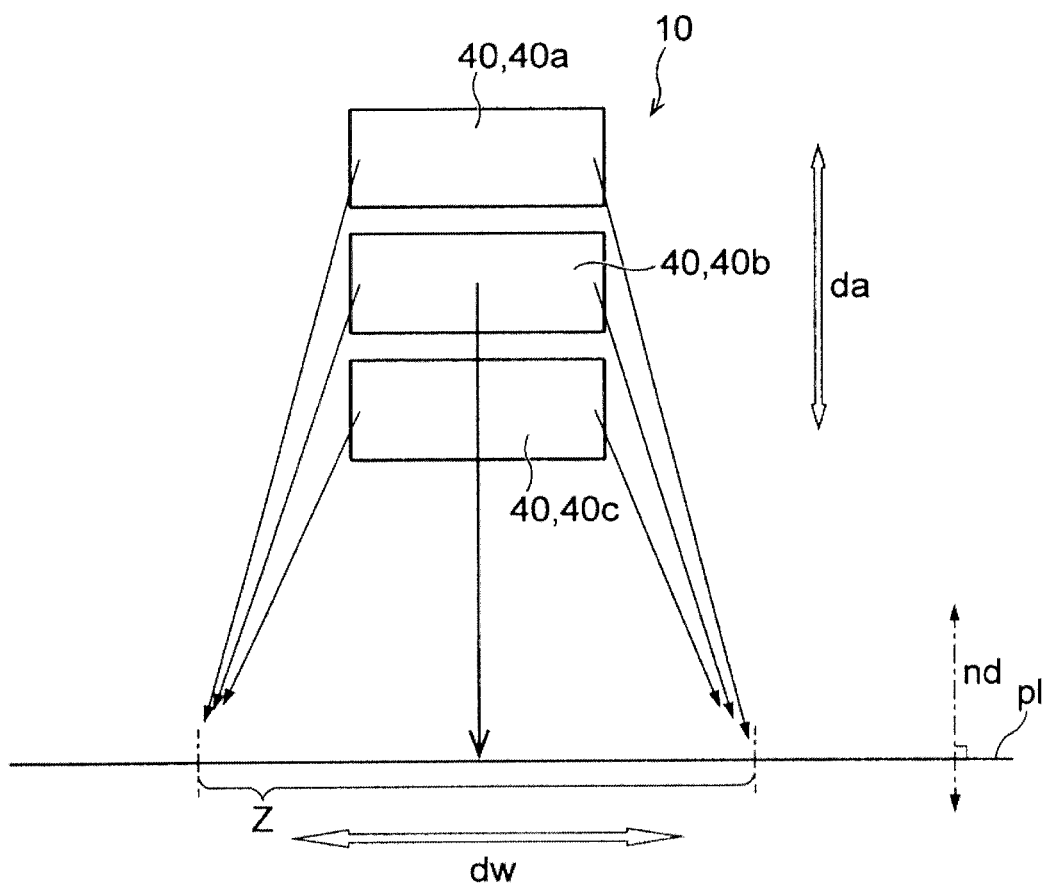
FIG. 2 is a diagram for explaining diffraction characteristics of a hologram component of the lighting device of FIG. 1.

As shown in FIG. 2, in the present embodiment, the diffracted light diffracted by each of the hologram components 40a, 40b, and 40c illuminates the entire region of the region to be illuminated Z. As will be described later, the diffracted light from each of the hologram components 40a, 40b, and 40c illuminates only the entire inside of the region to be illuminated Z, so that unevenness in brightness and unevenness in color in the region to be illuminated Z can be effectively made inconspicuous. In the present specification, "the entire region of the region to be illuminated Z" means not only the case where the illumination ranges of the diffracted light diffracted by the hologram components 40a, 40b, and 40c completely match with each other, but also the case where the shift of the respective illumination ranges is within ±20%. This numerical range is derived from experimental results based on the prototype of the lighting device 10 manufactured by the present inventors.

In the examples shown in FIGS. 1 and 2, the plurality of hologram components 40 is disposed in a first arrangement direction da, wherein the first arrangement direction da intersects, typically perpendicularly, with the longitudinal direction dl of the region to be illuminated Z. In addition, the first arrangement direction da in which the plurality of hologram components 40 is disposed is parallel to a normal direction nd to the plane pl as the flat surface where the region to be illuminated Z is located. In particular, in the illustrated example, the first arrangement direction da in which the plurality of hologram components 40 is disposed is typically a vertical direction perpendicular to the horizontal direction. That is, in the illustrated specific example, the diffracted light from a plurality of hologram components 40 disposed vertically above the ground or the water surface illuminates a horizontal plane pl such as the ground or the water surface, and the region to be illuminated Z is formed on the horizontal plane pl. Then, the plurality of hologram components 40 is disposed, for example, shifted in the vertical direction. The number of the plurality of hologram components 40 may be two or more, and the number is not limited. For example, when the plurality of hologram components 40 has a first hologram component and a second hologram component, and the region to be illuminated Z has the illumination range extending in the first direction and the second direction intersecting with each other, the illumination range of the diffracted light from the first hologram component is aligned with the illumination range of the diffracted light from the second hologram component in at least one of the first direction and the second direction of the region to be illuminated.

Figure 3:
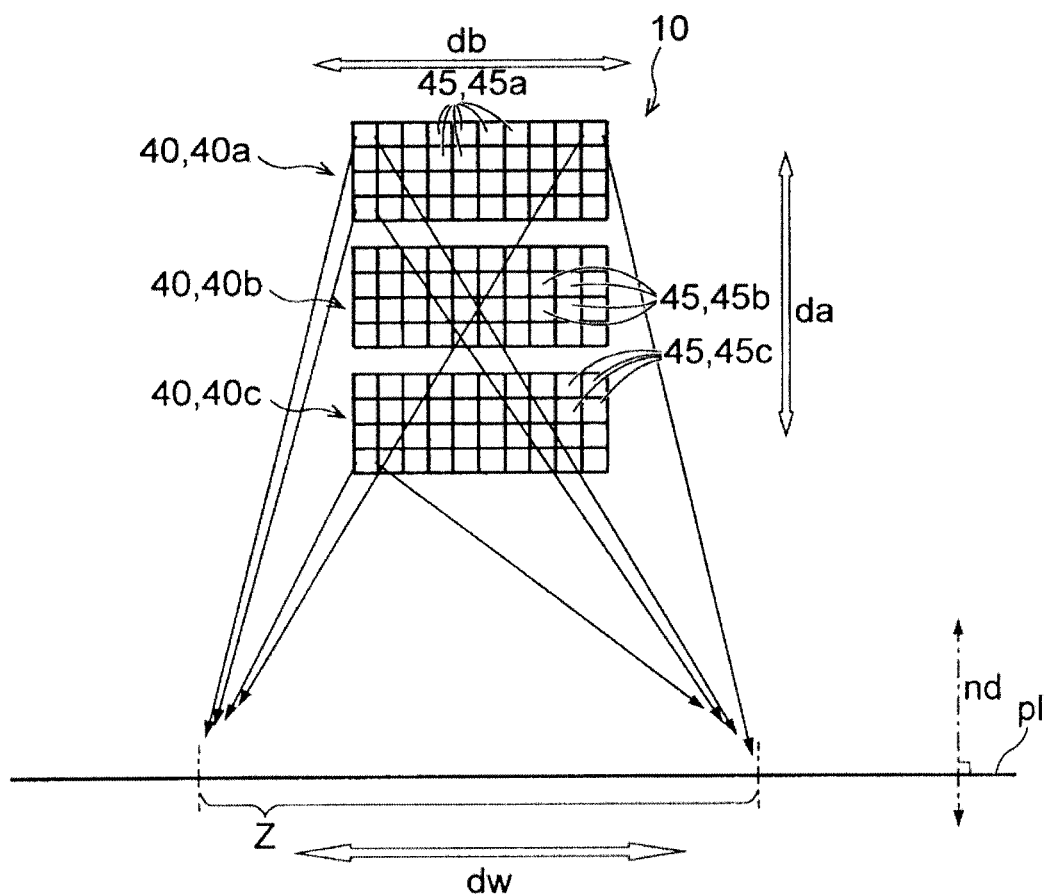
FIG. 3 is a diagram for explaining diffraction characteristics of an element hologram included in the hologram component of the lighting device of FIG. 1.

In addition, as shown in FIG. 3, each hologram component 40 is divided into a plurality of element holograms 45. Each element hologram 45 is configured as a hologram recording medium on which interference fringe patterns are recorded. By adjusting the interference fringe pattern variously, it is possible to control the traveling direction of light diffracted by each element hologram 45, in other words, the traveling direction of light diffused by each element hologram 45. Then, as shown in FIG. 3, the light from the light source device 15 incident on each element hologram 45 is diffracted by the element hologram 45 and illuminates the entire region of the region to be illuminated Z. As will be described later, the diffracted light from each element hologram component 45 illuminates only the inside of the region to be illuminated Z over its entire region, thereby making the unevenness of brightness in the region to be illuminated Z effectively inconspicuous.

In the example shown in FIG. 3, the first hologram component 40a includes a plurality of first element holograms 45a, the second hologram component 40b includes a plurality of second element holograms 45b, and the third hologram component 40c includes a plurality of third element holograms 45c. In each hologram component 40, the plurality of element holograms 45 is disposed in a first arrangement direction da parallel to the arrangement direction of the plurality of hologram components 40. That is, the plurality of element holograms 45 included in each hologram component 40 is disposed in the first arrangement direction da, wherein the first arrangement direction da intersects, typically perpendicularly, with the longitudinal direction dl of the region to be illuminated Z, and intersects, typically perpendicularly, with the normal direction nd to the plane pl formed by the region to be illuminated Z. In each of the hologram components 40, the plurality of element holograms 45 is disposed in the second arrangement direction db, wherein the second arrangement direction db intersects, typically perpendicularly, with the longitudinal direction dl of the region to be illuminated Z, and intersects, typically perpendicularly, with the normal direction nd to the plane pl formed by the region to be illuminated Z. In the example shown, the plural 45 are disposed in the vertical direction da and the horizontal direction db.

Here, the region to be illuminated Z can be considered as a region to be illuminated of a near field illuminated by the hologram component 40. This region to be illuminated Z can be expressed not only by the actual area to be illuminated (illumination range) but also by the diffusion angle range in an angular space after setting a certain coordinate axis as described later.

The element hologram 45 can be produced by using, for example, scattered light from an actual scattering plate as object light. More specifically, when the hologram photosensitive material, which is the base body of the element hologram 45, is illuminated with the reference light made of coherent light having mutual coherence and the object light, an interference fringe due to the interference of these lights is applied to the hologram photosensitive material, and the element hologram 45 is produced. A laser beam, which is coherent light, is used as the reference light, and, for example, scattered light from an isotropic scattering plate, which is available at low cost, is used as the object light.

By illuminating the element hologram 45 with a laser beam so as to advance in the opposite direction through the optical path of the reference light used in producing the element hologram 45, a reproduced image of the scattering plate is generated at the arrangement position of the scattering plate, which is the source of the object light used in producing the element hologram 45. When the scattering plate that is the source of the object light used in producing the element hologram 45 causes uniform surface scattering, the reproduced image of the scattering plate obtained by the element hologram 45 also is made with a uniform surface illumination. The region where the reproduced image of the scattering plate is generated can be the region to be illuminated Z.

Instead of forming a complex interference fringe pattern formed on each element hologram 45 by using actual object light and reference light, it is possible to design the pattern by using a computer based on the wavelength and the incident direction of the scheduled reproduced illumination light and the shape and the position of the image to be reproduced. The element hologram 45 thus obtained is also called a computer-generated hologram (CGH). For example, when the lighting device 10 is used to illuminate the region to be illuminated Z having a certain size on the ground or on the water surface, it is difficult to generate object light. It is preferable to use the computer-generated hologram as the element hologram 45.

Further, a Fourier transform hologram having the same diffusion angle characteristics at each point on each element hologram 45 may be formed by computer generation. Further, an optical member such as a lens may be provided on the downstream side of the hologram component 40 so that the diffracted light is adjusted so as to be incident on the entire region of the region to be illuminated Z.

One advantage of using the hologram component 40 is that the light energy density of light from the light source device 15, for example a laser beam, can be reduced by diffusion. Another advantage is that the element hologram 45 can be used as a surface light source with directivity, so that the hologram component 40 can reduce the luminance on the light source surface for achieving the same illuminance distribution can be reduced, compared with a conventional lamp light source (point light source). Thus, even when a laser beam source is used as the light source 20, it is possible to contribute to improvement in the safety of the laser beam, and even when the laser beam is viewed directly from the region to be illuminated Z with the eyes of a person, the possibility of adversely affecting the eyes of the person is reduced, compared with the case of looking directly at a single point light source with the eyes of a person.

On the other hand, the advantage of constructing the hologram component with the plurality of element holograms 45, as will be described in detail later, is that the edge can be sharp when illuminating the region to be illuminated Z, in particular the region to be illuminated Z within a finite distance. When the hologram component is a single Fourier-type hologram, blurring corresponding to the size of the region of the hologram occurs to the region to be illuminated Z. In the present embodiment, it is possible to design the diffraction characteristics of each element hologram 45 in consideration of the positional relationship with the region to be illuminated Z, and it is possible to remarkably improve the sharpness of the edge. That is, inclusion of the plurality of element holograms 45 having different diffraction characteristics in one hologram component 40 makes it possible to illuminate the region to be illuminated Z while sharpening edges. It should be noted that producing a single Fresnel-type hologram by photographing is restricted due to the difficulty of preparing object light, and producing a single Fresnel-type computer generated hologram means that calculation is performed over the entire region of hologram, and substantial restrictions arise from the viewpoint of calculation amount.

Furthermore, when coherent light typified by a laser beam is used, there arises a problem in that speckles occur as disclosed, for example, in WO 2012/033174. Speckles are recognized as a spot pattern and can give physiological discomfort. The hologram component 40 includes a plurality of element holograms 45, whereby the speckle patterns generated corresponding to the diffracted light from each element hologram 45 overlap and are averaged in the region to be illuminated Z, and are observed by an observer. This makes it possible to make speckles less conspicuous in each element region to be illuminated Zp.

A specific form of the element hologram 45 may be a volume-type hologram recording medium using a photopolymer, a volume-type hologram recording medium of a recording-type using a photosensitive medium containing a silver salt material, and a relief-type (emboss-type) hologram recording medium.

Next, the diffraction characteristics of the hologram component 40 will be described.

Figure 6:
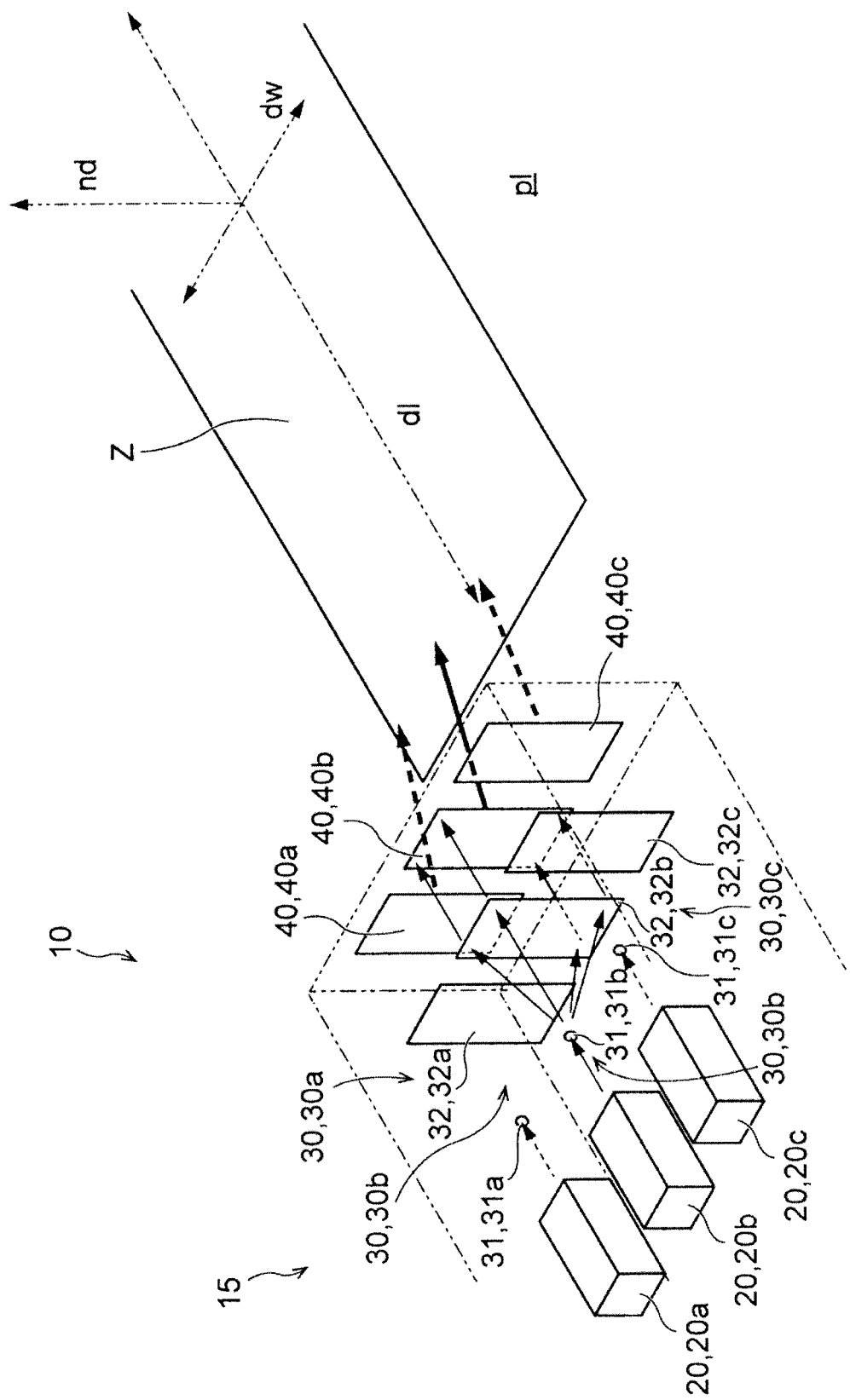
FIG. 6 is a perspective view corresponding to FIG. 1, and is a view of a modification of the lighting device.
Figure 7:
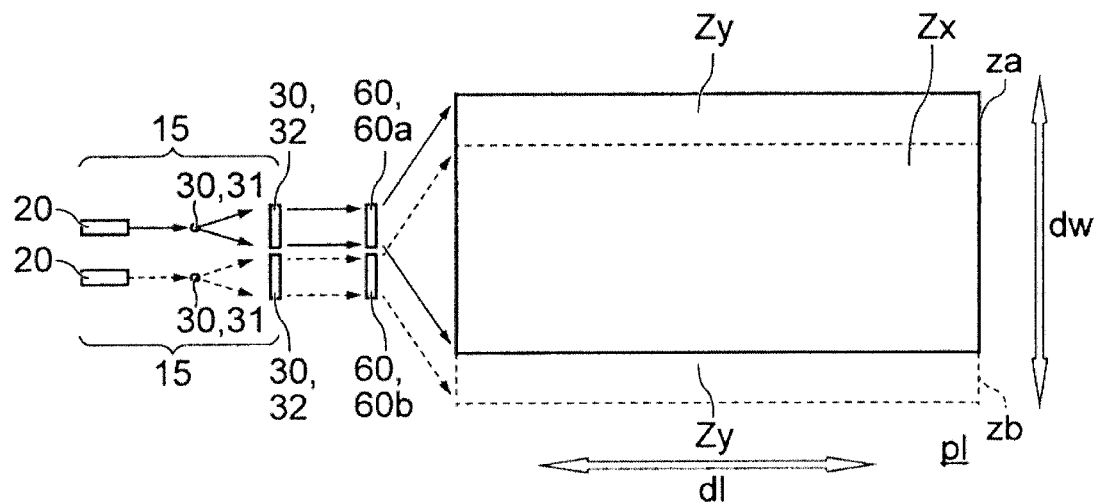
FIG. 7 is a diagram for explaining a relationship between an arrangement of a plurality of holograms having the identical diffraction characteristics and an illumination region.
Figure 8:
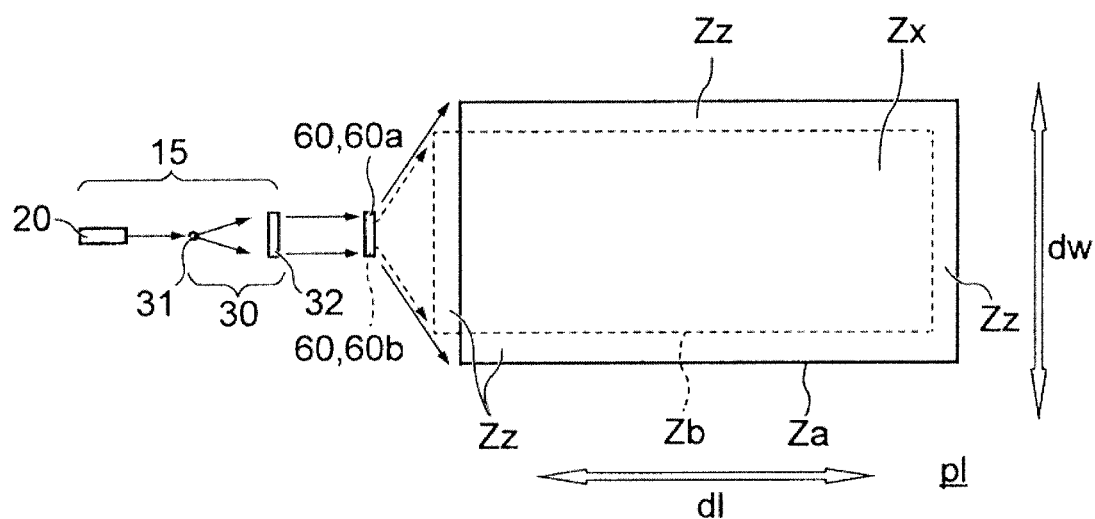
FIG. 8 is a diagram for explaining a relationship between an arrangement of a plurality of holograms having the identical diffraction characteristics and an illumination region.

First, referring to FIGS. 7 and 8, the relationship between the diffraction characteristics of the hologram and the illumination region illuminated by the diffracted light from the hologram will be described. Here, FIGS. 7 and 8 are diagrams showing illumination regions Za and Zb illuminated by diffracted light from a first hologram 60a and a second hologram 60b having the identical diffraction characteristics. It should be noted that "identical" means that the shift between the diffraction characteristics of the first hologram 60a and the second hologram 60b is within ±20%. This numerical range is derived from experimental results based on the prototype of the lighting device 10 manufactured by the present inventors. In this example, the first hologram 60a and the second hologram 60b emit diffracted light to the horizontal plane such as the ground and the water surface, and are held above the horizontal plane. That is, the diffracted light from the first hologram 60a and the second hologram 60b travels downward from the horizontal direction, and illuminates the ground pl intended to form the region to be illuminated Z. For example, in the examples shown in FIGS. 7 and 8, it is assumed that the road surface is illuminated by a front lamp of an automobile as in the examples of FIGS. 1 to 6. As in the element hologram 45, the holograms 60a and 60b are intended to diffract light to a region to be illuminated located forward and elongated forward. FIGS. 7 and 8 show the illumination regions Za and Zb illuminated by the diffracted light from the holograms 60a and 60b from the normal direction to the plane pl illuminated with the diffracted light.

In the example shown in FIG. 7 and FIG. 8, the first hologram 60a and the second hologram 60b are disposed at positions shifted from each other along a direction intersecting, typically perpendicularly, with the longitudinal direction dl of the originally intended region to be illuminated, and, typically in the vertical direction. In particular, in the example shown in FIG. 7, the arrangement direction of the first hologram 60a and the second hologram 60b matches with a direction intersecting with the normal direction nd to the plane pl where the region to be illuminated is formed, typically the horizontal direction. Meanwhile, in the example shown in FIG. 8, the arrangement direction of the first hologram 60a and the second hologram 60b matches with a direction parallel to the normal direction nd to the plane pl where the region to be illuminated is formed, typically in vertical direction. In addition, the light flux emitted from the light source device 15 shown in FIG. 1 is incident on each of the holograms 60a and 60b. Therefore, in the example shown in FIG. 8, the first hologram 60a and the second hologram 60b are disposed so as to overlap with each other in the depth direction of the paper, and the first and the second light source device 15 are disposed so as to overlap in the depth direction of the paper.

In the example shown in FIG. 7, the illumination region Za by the diffracted light from the first hologram 60a and the illumination region Zb by the diffracted light from the second hologram 60b are shifted in a direction parallel to the arrangement direction of the holograms 60a and 60b. More specifically, the illumination region Za illuminated by the diffracted light from the first hologram 60a and the illumination region Zb illuminated by the diffracted light from the second hologram 60b are shifted in a direction intersecting with the longitudinal direction dl of the illumination region, typically the width direction dw perpendicular to the longitudinal direction dl. Therefore, of the region to be illuminated Zx illuminated by the light emitted from the two holograms 60a and 60b, both edge portions Zy located at both edges of the width direction dw and extending in the longitudinal direction dl are illuminated only by light emitted from one of the two holograms 60a and 60b.

In the example shown in FIG. 8, the two holograms 60a and 60b are disposed so as to be shifted in the normal direction nd to the plane pl illuminated with the diffracted light. That is, the distances from the two holograms 60a and 60b to the plane pl diffracted by the diffracted light differs. Therefore, as shown in FIG. 8, the illumination region Za illuminated by the diffracted light from the first hologram 60a and the illumination region Zb illuminated by the diffracted light from the second hologram 60b are shifted in both the longitudinal direction dl and the width direction dw of the illumination region. Therefore, a peripheral edge portion Zz of the region to be illuminated Zx illuminated by the light emitted from the two holograms 60a and 60b is illuminated only by the light emitted from one of the two holograms 60a and 60b.

Both edge portions Zy of FIG. 7 and the peripheral edge portion Zz of FIG. 8, which are illuminated only by diffracted light from one hologram 60, will be illuminated darker than the other portions when the wavelength regions of light emitted from the two holograms 60a and 60b are identical. Further, when the wavelength regions of the light emitted from the two holograms 60a and 60b are different, the both edge portions Zy of FIG. 7 and the peripheral edge portion Zz of FIG. 8 are illuminated darker in different colors than the other portions. That is, when the diffraction characteristics of the two holograms 60a and 60b are identical, the edge of the region to be illuminated Z becomes blurred due to a decrease in brightness or a change in color.

In the lighting device 10 shown in FIGS. 1 to 3, the light traveling from the light source device 15 to each hologram component 40 is a parallel light flux as in the example shown in FIGS. 7 and 8. The plurality of hologram components 40 and the plurality of element holograms 45 are disposed such that its light incident face and light emission face are parallel to each other and incident light to each hologram component 40 and each element hologram 45 is a parallel light flux along the normal direction of the hologram component 40 and the normal direction of the element hologram 45.

As shown in FIG. 3, the plurality of element holograms 45 included in each hologram component 40 is disposed in the second arrangement direction db wherein the second arrangement direction db intersects, typically perpendicularly, with the longitudinal direction dl of the region to be illuminated Z, and intersects, typically perpendicularly and parallelly, with the normal direction nd to the plane pl formed by the region to be illuminated Z. The relative positional relationship of the element holograms 45 disposed in the second arrangement direction db is the same as the relative positional relationship of the holograms 60a and 60b shown in FIG. 7. In addition, the plurality of element holograms 45 included in one hologram component 40 is also disposed in the first arrangement direction da wherein the first arrangement direction da intersects, typically perpendicularly, with the longitudinal direction dl of the region to be illuminated Z, and is parallel to the normal direction nd to the plane pl formed by the region to be illuminated Z. In addition, since the plurality of hologram components 40 is disposed in the first arrangement direction da, the element holograms 45 included in the different hologram components 40 are also disposed in the first arrangement direction da. The relative positional relationship of the element holograms 45 disposed in the first arrangement direction da is the same as the relative positional relationship between the holograms 60a and 60b shown in FIG. 8.

Meanwhile, as shown in FIG. 2, the diffracted light from each hologram component 40 illuminates the entire region of the region to be illuminated Z. Furthermore, in the illustrated example, as shown in FIG. 3, the diffracted light from each element hologram 45 illuminates only the entire region to be illuminated Z. In order to make such illumination implementable, the diffraction characteristics of each element hologram 45 is adjusted as described below.

Figure 4:
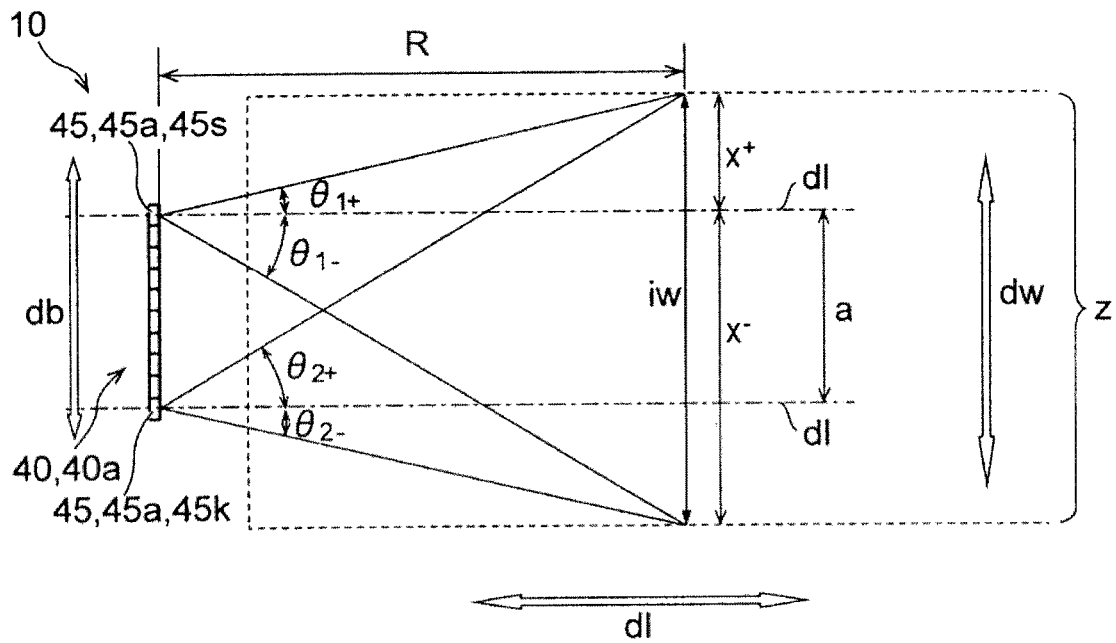
FIG. 4 is a diagram for explaining a method of adjusting diffraction characteristics of a hologram component and an element hologram.

First, assuming that the diffracted light from the element hologram 45 disposed shifted in the second arrangement direction db is identical to each other without particularly adjusting the diffraction characteristics of the element hologram 45, as described with reference to FIG. 7, the diffracted light is displaced in the second arrangement direction db which is the arrangement direction of the element hologram 45, and illuminates the plane pl formed by the region to be illuminated Z. Therefore, as shown in FIG. 4, the diffraction characteristics of the element hologram 45 disposed in the second arrangement direction db are adjusted so that the illumination width iw along the width direction dw perpendicular to the longitudinal direction dl of the diffracted light from one element hologram 45s incident on an optional position along the longitudinal direction dl of the region to be illuminated Z is identical to the illumination width iw along the width direction dw of the diffracted light from another element hologram 45k incident on the optional position along the longitudinal direction dl of the region to be illuminated Z. The adjustment of the diffraction characteristics is performed over the entire region along the longitudinal direction of the region to be illuminated Z. FIG. 4 is a view showing the hologram component 40 and the region to be illuminated Z by observation from the normal direction nd to the illumination plane pl, which is illuminated with illumination light from the lighting device 10 and includes the region to be illuminated Z. In the present specification, the illumination width iw is "identical" means that the shift of the illumination width iw is within ±20%. This numerical range is derived from experimental results based on the prototype of the lighting device 10 manufactured by the present inventors.

In the example shown in FIG. 4, the diffraction characteristics of the light traveling to the position in the region to be illuminated Z separated from each element hologram 45 by the distance R along the longitudinal direction dl are adjusted according to the width of the region to be illuminated Z. Also, diffraction characteristics can be adjusted using diffusion angle distribution in angular space. First, the diffraction characteristics of a reference element hologram 45s is adjusted. For example, in the example shown in FIG. 4, the diffusion angle characteristics of the reference element hologram 45s traveling to a position away from the reference element hologram 45s by a distance R along the longitudinal direction dl are determined as follows according to the coordinate system shown in FIG. 4.

$$\tan(\theta_{1+})=x^+/R$$

$$\tan(\theta_{1-})=x^-/R$$

Next, the diffusion angle characteristics of another element hologram 45k are determined by considering the diffusion angle characteristics of the reference element hologram 45s, and the shift amount a in the second arrangement direction db from the reference element hologram 45s to the element hologram 45k. Specifically, it is determined as follows.

$$\tan(\theta_{2+})=(x^++a)/R$$

$$\tan(\theta_{2-})=(x^--a)/R$$

The diffusion angle characteristics of the reference element hologram 45s are performed over the entire region along the longitudinal direction dl of the region to be illuminated Z. Similarly, the diffusion angle characteristics of another element hologram 45k are also performed over the entire region along the longitudinal direction dl of the region to be illuminated Z.

Next, assuming that the diffracted light from the element hologram 45 disposed shifted in the first arrangement direction da is identical to each other without particularly adjusting the diffraction characteristics of the element hologram 45, as described with reference to FIG. 8, the diffracted light is displaced both in the front direction when viewed from the element hologram 45 and in the direction perpendicular to the front direction. That is, in the example shown in the drawing, the diffracted light is displaced both in the longitudinal direction dl and the width direction dw of the region to be illuminated Z on the plane pl on which the region to be illuminated Z is located and illuminates the plane pl. Therefore, in the same manner as the adjustment of the diffraction characteristics of the element hologram 45 disposed shifted in the second arrangement direction db. In the same manner as the adjustment of the diffraction characteristics in the angular space described with reference to FIG. 4 as one specific example, the diffraction characteristics of the element hologram 45 disposed in the first arrangement direction da are adjusted so that the illumination width iw along the width direction dw perpendicular to the longitudinal direction dl of the diffracted light from one element hologram 45s incident on an optional position along the longitudinal direction dl of the region to be illuminated Z is identical to the illumination width iw along the width direction dw of the diffracted light from each of other element holograms 45t and 45n incident on the optional position along the longitudinal direction dl of the region to be illuminated Z.

Figure 5:
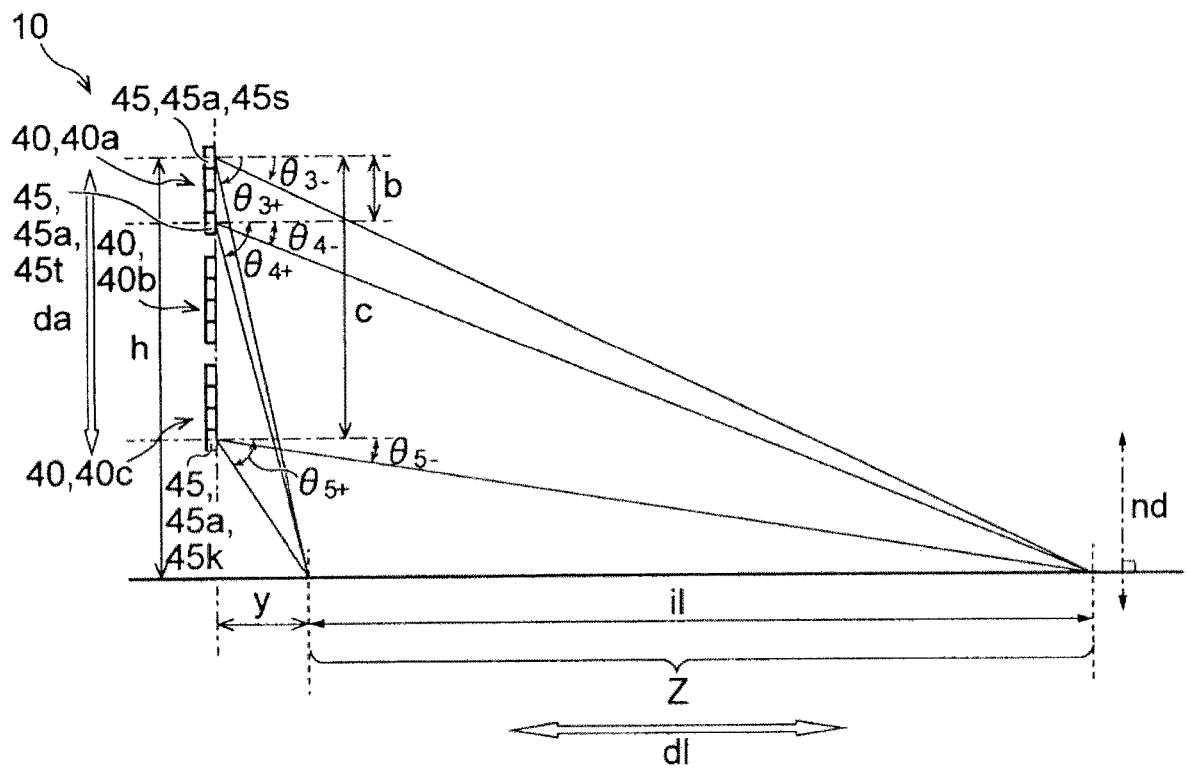
FIG. 5 is a diagram for explaining a method of adjusting diffraction characteristics of the hologram component and the element hologram.

Further, as shown in FIG. 5, the diffraction characteristics of the element hologram 45 disposed in the first arrangement direction da are adjusted so that the illumination length il along the longitudinal direction dl of the diffracted light from one element hologram 45s incident on an optional position along the width direction dw of the region to be illuminated Z is identical to the illumination length il along the longitudinal direction dl of the diffracted light from each of other element holograms 45t and 45n incident on the optional position along the width direction dw of the region to be illuminated Z. FIG. 5 is a diagram showing the hologram component 40 and the region to be illuminated Z on the plane parallel to both the normal direction nd to the illumination plane pl formed by the region to be illuminated Z and the first arrangement direction da. In this specification, the illumination length il is "identical" means that the shift of the illumination length il is within ±20%. This numerical range is derived from experimental results based on the prototype of the lighting device 10 manufactured by the present inventors.

In the example shown in FIG. 5, the diffraction characteristics of the light traveling to an optional position the width direction dw from each element hologram 45 disposed in the first arrangement direction da are adjusted according to the length of the region to be illuminated Z. Also, diffraction characteristics can be adjusted using diffusion angle distribution in angular space. First, the diffraction characteristics of a reference element hologram 45s is adjusted. For example, in the example shown in FIG. 5, the diffusion angle characteristics of the reference element hologram 45s traveling to an optional position in the width direction dw are determined as follows according to the coordinate system shown in FIG. 5.

$$\tan(\theta_{3+})=h/y$$

$$\tan(\theta_{3-})=h/(y+il)$$

"h" in the equation represents the distance in the first arrangement direction da from the illumination plane pl where the region to be illuminated Z is formed to the reference element hologram 45, that is, the height of the position where the reference element hologram 45 is disposed.

Next, the diffusion angle characteristics of another element hologram 45t included in the first hologram component 40a identical to the reference element hologram 45s are determined by considering the diffusion angle characteristics of the reference element hologram 45s, and the shift amount b in the first arrangement direction da from the reference element hologram 45s to the element hologram 45t. Specifically, it is determined as follows. In this specification, the diffusion angle characteristics are "identical" means that the shift of the diffusion angle characteristics is within ±20%. This numerical range is derived from experimental results based on the prototype of the lighting device 10 manufactured by the present inventors.

$$\tan(\theta_{4+})=(h-b)/y$$

$$\tan(\theta_{4-})=(h-b)/(y+il)$$

Further, with respect to another element hologram 45n included in the hologram component 40 different from the reference element hologram 45s, the diffusion characteristic can be similarly determined. That is, the diffusion angle characteristics of another element hologram 45n included in the third hologram component 40c are determined by considering the diffusion angle characteristics of the reference element hologram 45s, and the shift amount c in the first arrangement direction da from the reference element hologram 45s to the element holograms 45n. Specifically, it is determined as follows.

$$\tan(\theta_{5+})=(h-c)/y$$

$$\tan(\theta_{5-})=(h-c)/(y+il)$$

The diffusion angle characteristics of the reference element hologram 45s in the longitudinal direction dl are performed over the entire region along the width direction dw of the region to be illuminated Z. Similarly, the diffusion angle characteristics of each of other element holograms 45t and 45*n* are also performed over the entire region along the width direction dw of the region to be illuminated Z.

By adjusting the diffraction characteristics of the hologram component 40 and the element hologram 45 as described above, each of the diffracted light from each hologram component 40 illuminates only the entire region to be illuminated Z, and each of the diffracted light from each element hologram 45 illuminates only the entire region to be illuminated Z.

According to the present embodiment described above, the diffraction characteristics of each hologram component 40 are adjusted according to the difference in arrangement positions of the plurality of hologram components 40, and as a result, diffracted light from each hologram component 40 illuminates the region to be illuminated Z. Therefore, when the diffracted light from the plurality of hologram components 40 is light in the identical wavelength region, it is possible to illuminate the region to be illuminated Z brightly. In addition, when the diffracted light from the plurality of hologram components 40 is light in different wavelength regions, it is possible to illuminate the region to be illuminated Z with a desired color by additive color mixing. In this embodiment, since the diffracted light from each hologram component 40 illuminates the region to be illuminated Z, the light emitting points are dispersed, so that the adverse effect on the eyes of a person who looks directly at the lighting device 10 can be reduced. In addition, since the diffracted light from each hologram component 40 illuminates the entire region to be illuminated Z, it is possible to effectively suppress unevenness in brightness and unevenness in color in the vicinity of the edge of the region to be illuminated Z. Thus, it is possible to safely illuminate the region to be illuminated Z while making its edge sharp.

Further, in the present embodiment, the region to be illuminated Z having the longitudinal direction dl is illuminated by the diffracted light from the hologram component 40. Therefore, by adjusting the diffraction characteristics of the hologram component 40, even in the case where the region to be illuminated Z is located in front of the lighting device 10 and has the longitudinal direction dl in the direction away from the lighting device 10, it is possible to brightly illuminate a far region away from the lighting device 10 with higher light irradiation intensity. As a result, it is possible to illuminate safely, while making its edge sharp, the region to be illuminated Z having the longitudinal direction dl, for example, the region to be illuminated Z where the ratio of the length in the longitudinal direction dl to the length in the width direction dw is 10 or more, furthermore, the region to be illuminated Z with the ratio of 100 or more, and more typically, the line-shaped region to be illuminated Z.

It should be noted that as a method of adjusting the diffraction characteristics of each hologram component 40, where the plurality of hologram components 40 is disposed in a first arrangement direction da which is a direction perpendicular to the longitudinal direction dl of the region to be illuminated Z and parallel to the normal direction nd to the plane pl where the region to be illuminated Z is formed, the illumination length il along the longitudinal direction dl of the diffracted light from one hologram component 40 incident on an optional position along the width direction dw orthogonal to the longitudinal direction dl of the region to be illuminated Z may be identical to the illumination length il along the longitudinal direction dl of the diffracted light from another hologram component 40 incident on the optional position along the width direction dw of the region to be illuminated Z, and the illumination width iw along the width direction dw of the diffracted light from one hologram component 40 incident on an optional position along the longitudinal direction dl of the region to be illuminated Z may be identical to the illumination width iw along the width direction dw of diffracted light from another hologram component 40 incident on the optional position along the longitudinal direction dl of the region to be illuminated Z. Such adjustment can be implemented while making the lighting device 10 simple and compact. Therefore, while it is possible to make the lighting device 10 simple and compact, it is possible to safely illuminate the region to be illuminated Z having the longitudinal direction dl, typically the line-shaped region to be illuminated Z, while making the edge sharp.

Further, according to the present embodiment, the hologram component 40 includes a plurality of element holograms 45. The diffraction characteristics of each element hologram 45 are adjusted according to the difference in arrangement positions of the plurality of element holograms 45. As a result, the diffracted light from each element hologram 45 illuminates the entire region of the region to be illuminated Z. Therefore, unevenness in brightness in the vicinity of the edge of the region to be illuminated Z can be effectively suppressed. In this way, it is possible to illuminate the region to be illuminated Z while making its edge sharp. In addition, since one hologram component 40 has the same number of light emitting points as the number of element holograms 45, it is possible to reduce the degree of adverse influence on the eyes of a person who looks directly at the lighting device 10. In addition, since the diffracted light from each element hologram 45 is superimposed in the region to be illuminated Z, speckles can be effectively made inconspicuous even when a laser beam is used.

Furthermore, the region to be illuminated Z having the longitudinal direction dl is illuminated by the diffracted light from each element hologram 45. Therefore, by adjusting the diffraction characteristics of the element hologram 45, even when the region to be illuminated Z is positioned in front of the lighting device 10 and has the longitudinal direction dl in the direction away from the lighting device 10, it is possible to brightly illuminate a far region away from the lighting device 10 with higher light irradiation intensity. As a result, it is possible to safely illuminate the region to be illuminated Z having the longitudinal direction dl, typically the line-shaped region to be illuminated Z while making the edges sharp.

As a method for adjusting diffraction characteristics of each element hologram 45, wherein the plurality of element holograms 45 is disposed in the second arrangement direction db which is perpendicular to the longitudinal direction dl of the region to be illuminated Z and perpendicular to the normal direction nd to the plane pl on which the region to be illuminated Z is formed, the illumination width iw along the width direction dw orthogonal to the longitudinal direction dl of the diffracted light from one element hologram 45 incident on an optional position along the longitudinal direction dl of the region to be illuminated Z may be identical to the illumination width iw along the width direction dw of the diffracted light from another element hologram 45 incident on the optional position along the longitudinal direction dl of the region to be illuminated Z. Such adjustment can be implemented while making the lighting device 10 simple and compact. Therefore, while it is possible to make the lighting device 10 simple and compact, it is possible to safely illuminate the region to be illuminated Z having the longitudinal direction dl, typically the line-shaped region to be illuminated Z, while making the edge sharp.

In addition, as a method of adjusting the diffraction characteristics of each element hologram 45, where the plurality of element holograms 45 is disposed in a first arrangement direction da which is a direction perpendicular to the longitudinal direction dl of the region to be illuminated Z and parallel to the normal direction nd to the plane pl where the region to be illuminated Z is formed, the illumination length il along the longitudinal direction dl of the diffracted light from one element hologram 45 incident on an optional position along the width direction dw orthogonal to the longitudinal direction dl of the region to be illuminated Z may be identical to the illumination length il along the longitudinal direction dl of the diffracted light from another element hologram 45 incident on the optional position along the width direction dw of the region to be illuminated Z, and the illumination width iw along the width direction dw of the diffracted light from one element holograms 45 incident on an optional position along the longitudinal direction dl of the region to be illuminated Z may be identical to the illumination width iw along the width direction dw of diffracted light from another element hologram 45 incident on the optional position along the longitudinal direction dl of the region to be illuminated Z. Such adjustment can be implemented while making the lighting device 10 simple and compact. Therefore, while it is possible to make the lighting device 10 simple and compact, it is possible to safely illuminate the region to be illuminated Z having the longitudinal direction dl, typically the line-shaped region to be illuminated Z, while making the edge sharp.

Furthermore, in the above-described embodiment, the light source device 15 includes the light source 20 that generates a laser beam and the shaping optical system 30 that shapes the light emitted from the light source 20. In particular, in the illustrated example, the shaping optical system 30 converts the light from the light source 20 into a parallel light flux. Therefore, the parallel light flux is incident on each element hologram 45 of the hologram component 40. According to this example, design and manufacture of the hologram component 40 and the element hologram 45 can be facilitated. In addition, by diffraction at the hologram component 40, it becomes possible to direct the light with high accuracy to the entire region within the region to be illuminated Z.

It is to be noted that various modifications can be made to the above-described embodiment. Hereinafter, a modification will be described with reference to the drawings. In the following description and the drawings used in the following description, the same reference numerals as those used for the corresponding parts in the above-described embodiments are used for parts that can be configured as in the above-described embodiments, and duplicate explanation will be omitted.

In the above-described embodiment, as shown in FIG. 1, an example is indicated where the plurality of hologram components 40 is disposed in the first arrangement direction da which is perpendicular to the longitudinal direction dl of the region to be illuminated Z and parallel to the normal direction nd to the plane pl on which the region to be illuminated Z is formed. That is, in the case where the region to be illuminated Z is provided on a horizontal plane such as the ground or water surface, an example is shown in which a plurality of hologram components 40 is disposed in the vertical direction. However, the present invention is not limited to this example, and a plurality of hologram components 40 may be disposed as shown in FIG. 6. In the example shown in FIG. 6, the plurality of hologram components 40 is disposed in the second arrangement direction db which is perpendicular to the longitudinal direction dl of the region to be illuminated Z and perpendicular to the normal direction nd to the plane pl on which the region to be illuminated Z is formed. More specifically, when the region to be illuminated Z is provided on a horizontal plane such as the ground or water surface, a plurality of hologram components 40 may be disposed in the horizontal direction. Also in this example, the diffraction characteristics of each hologram component 40 are adjusted according to the difference in arrangement positions of the plurality of hologram components 40, and as a result, the diffracted light from each hologram component can illuminate the entire region of the region to be illuminated Z. Adjusting the diffraction characteristics of the hologram component 40 in this manner can provide the same operational effects as those of the above-described embodiment.

As a method for adjusting diffraction characteristics of each hologram component 40, wherein the plurality of hologram components 40 is disposed in the second arrangement direction db which is perpendicular to the longitudinal direction dl of the region to be illuminated Z and perpendicular to the normal direction nd to the plane pl on which the region to be illuminated Z is formed, as described with reference to FIG. 4, the illumination width iw along the width direction dw orthogonal to the longitudinal direction dl of the diffracted light from one hologram component 40 incident on an optional position along the longitudinal direction dl of the region to be illuminated Z may be identical to the illumination width iw along the width direction dw of the diffracted light from another hologram component 40 incident on the optional position along the longitudinal direction dl of the region to be illuminated Z. Such adjustment can be implemented while making the lighting device 10 simple and compact. Therefore, while it is possible to make the lighting device 10 simple and compact, it is possible to safely illuminate the region to be illuminated Z having the longitudinal direction dl, typically the line-shaped region to be illuminated Z, while making the edge sharp.

Further, in the above-described embodiment, an example in which the hologram component 40 is divided into the plurality of element holograms 45 has been described. However, the present invention is not limited to this example, and each hologram component 40 may be formed as a single hologram. Even in such a modification, the diffracted light from each of the plurality of hologram components 40 included in the lighting device 10 is incident on the entire region of the region to be illuminated Z, so that it is possible to illuminate safely, while making its edge sharp, a region to be illuminated having a longitudinal direction, typically, a line-shaped region to be illuminated.

Furthermore, in the above-described embodiment, the lighting device 10 includes a plurality of hologram components 40. The present invention is not limited thereto. The lighting device 10 may have only a single hologram component 40. In this example, the hologram component 40 includes a plurality of element holograms 45, so that the diffracted light from each element hologram 45 is incident on the entire region of the region to be illuminated Z, whereby it is possible to safely illuminate a region to be illuminated, while making sharp the edge of the region to be illuminated Z having the longitudinal direction, typically a line shaped region to be illuminated.

Furthermore, in the above-described embodiment, the example in which independent light source device 15 is prepared for each of the plurality of hologram components 40 is shown. The present invention is not limited thereto. Any one of the light source 20, the shaping optical system 30 and the lens 31 may be shared by the plurality of hologram components 40.

Figure 9:
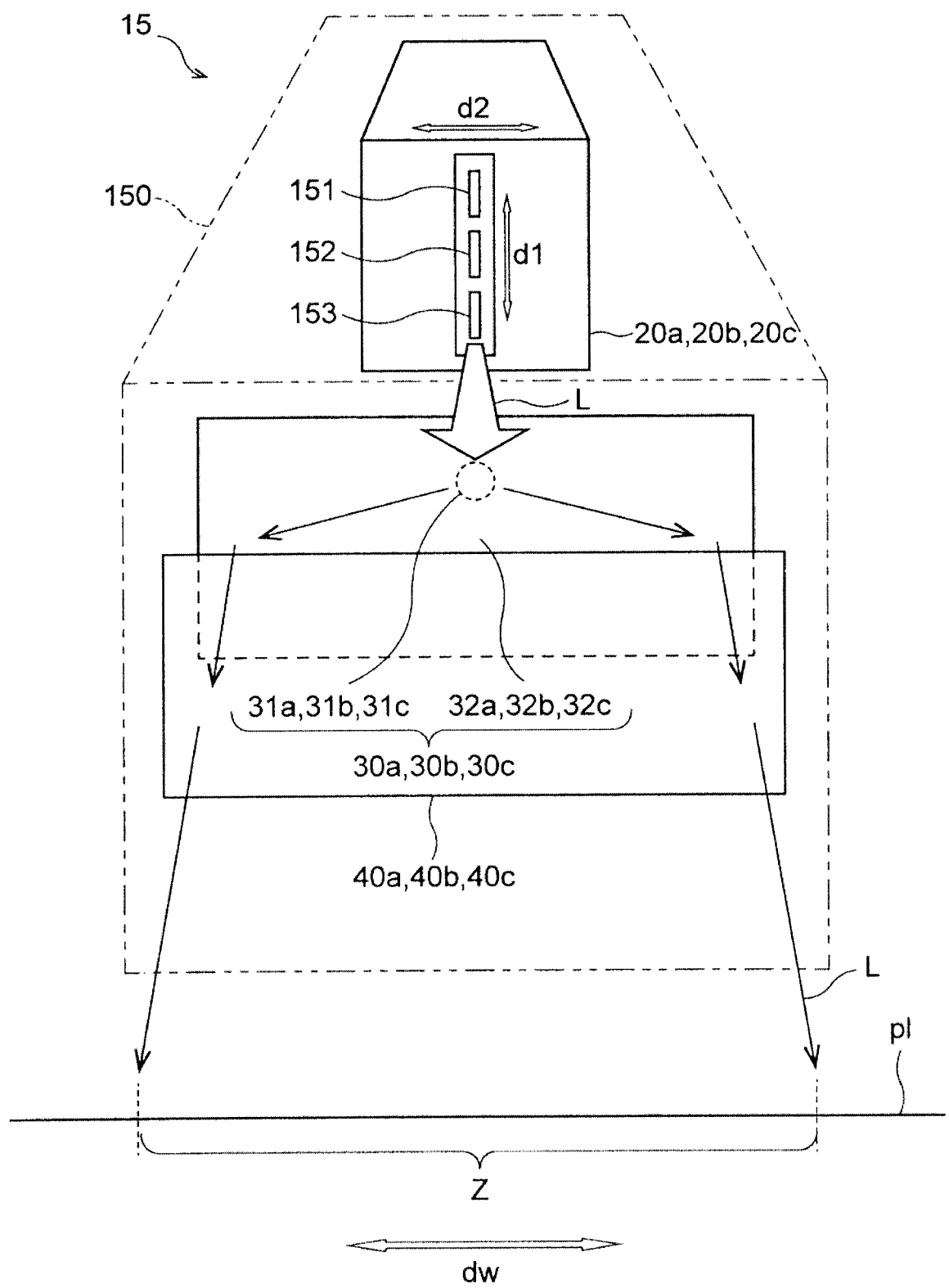
FIG. 9 is a diagram for describing a modification of the lighting device.

FIG. 9, each of the first to the third laser beam sources 20a to 20c of the light source device 15 may include a first light emitting portion 151, a second light emitting portion 152, and a third light emitting portion 153 which have a long axis direction d1 and a short axis direction d2 orthogonal thereto. In FIG. 9, for the sake of convenience, the first to the third laser beam sources 20a to 20c, the first to the third shaping optical systems 30a to 30c, and the first to the third hologram components 40a to 40c are collectively shown as one. The actual laser beam sources 20a to 20c, the shaping optical systems 30a to 30c and the hologram components 40a to 40c may be disposed in the vertical direction as shown in FIG. 1, or in the horizontal direction as shown in FIG. 6.

Here, the long axis direction d1 of the light emitting portions 151 to 153 is a direction in which the diffusion angle is the maximum in the diffusion direction of the laser beam emitted from the light emitting portions 151 to 153. The long axis direction d1 can also be said to be a direction parallel to the maximum diameter of the cross section of the laser beam orthogonal to the optical axis. In the example shown, the long axis direction d1 matches with the vertical direction. The short axis direction d2 is a direction in which the diffusion angle is the minimum in the diffusion direction of the laser beam emitted from the light emitting portions 151 to 153. The short axis direction d2 can also be said to be a direction parallel to the minimum diameter of the cross section of the laser beam orthogonal to the optical axis. In the illustrated example, the short axis direction d2 matches with the horizontal direction.

The light emitting portions 151 to 153 are disposed at the same position in the short axis direction d2 with a space in the long axis direction d1. That is, the laser beam sources 20a to 20c are disposed in the casing 150 of the light source device 15 in such a posture that the short axis direction d2 of the light emitting portions 151 to 153 is parallel to the width direction dw, that is, in the horizontal direction, of the region to be illuminated Z.

The laser beam L emitted so as to spread from the light emitting portions 151 to 153 of the laser beam sources 20a to 20c disposed in this way in the short axis direction d2 is shaped so as to spread in the width direction dw by the hologram components 40a to 40c after shaped by the shaping optical systems 30a to 30c.

When the long axis direction d1 is parallel to the width direction dw, the light emitting portions 151 to 153 emit laser beams diffused at a large diffusion angle in the width direction dw. It is difficult for the laser beam having a large diffusion angle to be sufficiently collimated by the collimating lenses 32a to 32c of the shaping optical systems 30a to 30c. When shaping the laser beam having insufficient collimation into diffracted light having the desired beam shape at the hologram components 40a to 40c, a burden is placed on the shape of the hologram components 40a to 40c, and the cost of the hologram components 40a to 40c may rise and dimensional accuracy may deteriorate.

In contrast, according to the example shown in FIG. 9, the laser beam L can be emitted from the light emitting portions 151 to 153 with a small diffusion angle in the width direction dw. Since the collimating lenses 32a to 32c of the shaping optical systems 30a to 30c can sufficiently collimate the laser beam L having a small spreading angle, it is possible to obtain diffracted light having a desired beam shape without imposing a burden on the shape of the hologram components 40a to 40c.

Therefore, according to the example shown in FIG. 9, it is possible to reliably and inexpensively illuminate line-shaped light which makes the edge sharp on the road surface.

Figure 10:
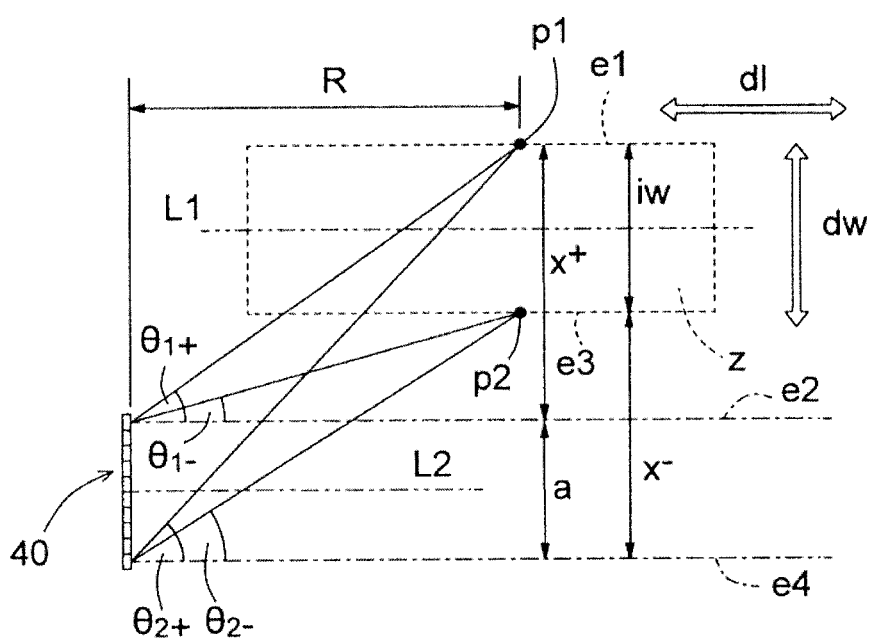
FIG. 10 is a diagram showing an example in which the center line of a region to be illuminated is shifted from a projection line.

Although, in the above FIG. 4, the example is shown where a center line L1 extending in the longitudinal direction passing through the center position in the width direction orthogonal to the longitudinal direction of the illumination region matches with a projection line L2 obtained by projecting an illumination light beam extending in the longitudinal direction through the center position of the hologram component 40 onto a plane of the region to be illuminated Z, as shown in FIG. 10, the center line L1 of the region to be illuminated Z may be shifted from the projection line L2.

In FIG. 10, as in FIG. 4, the width in the lateral direction of the region to be illuminated Z is iw, the horizontal width of the hologram component 40 is a, the shortest distance from the hologram component 40 to the nearest position of the region to be illuminated Z is R, the distance between a first edge e1 in the longitudinal direction of the region to be illuminated Z and a first end line e2 extending in the longitudinal direction of the region to be illuminated Z passing through the first end in the horizontal direction of the hologram component 40 is x+, and the distance between a second edge e3 in the longitudinal direction of the region to be illuminated Z and a second end line e4 extending in the longitudinal direction of the region to be illuminated Z passing through the second end in the horizontal direction of the hologram component 40 is x−. Further, when the boundary positions in the short axis direction through an optional position in the region to be illuminated Z are p1 and p2, the angle formed by the position p1 and the first end line e2 is $\theta_{1+}$, the angle formed by the position p2 and the first end line e2 is $\theta_{1-}$, the angle formed by the position p1 and the second end line e4 is $\theta_{2+}$, and the angle formed by the position p2 and the second end line e4 is $\delta_{2-}$, the following equation holds.

$$\tan(\theta_{1+}) = x^+/R$$

$$\tan(\theta_{1-}) = (x^+ - iw)/R$$

$$\tan(\theta_{2+}) = (x^+ + a)/R$$

$$\tan(\theta_{2-}) = x^-/R$$

In this way, by designing the diffraction characteristics of the hologram component 40 so as to satisfy the above equation, it is possible to illuminate the region to be illuminated Z in an optional direction and an optional position with respect to the hologram component 40.

Part of the laser beam incident on the hologram component 40 is zeroth-order light which is transmitted as it is without being diffracted by the hologram component 40. In the case where the zeroth-order light illuminate the region to be illuminated Z, the illuminance is specifically increased only at the zeroth-order light illumination position in the region to be illuminated Z designed in advance. When the case where the zeroth-order light illuminates the nearest end in the longitudinal direction of the region to be illuminated Z and the case where the zeroth-order light illuminates the farthest end are compared when the position of the hologram component 40 is set as a reference, the illumination area of the zeroth-order light is small, and the illuminance per unit area is high in the case of the nearest end, whereby the illumination position of the zeroth-order light in the region to be illuminated Z is more conspicuous, compared with the case of the farthest end. Therefore, it is desirable to design the diffraction characteristics of the hologram component 40 so that the zeroth-order light is incident on the farthest end rather than the nearest end in the longitudinal direction of the region to be illuminated Z. This makes it possible to suppress variations in light intensity, that is, illuminance, over the entire region of the region to be illuminated Z.

In FIG. 1 and the like, the collimating lenses 32*a* to 32*c* of the shaping optical systems 30*a* to 30*c* collimate the laser beam, which then is incident on the hologram components 40*a* to 40*c*. In order to suppress the blur of the region to be illuminated Z, it is desirable to collimate the incident light to the hologram components 40*a* to 40*c*. However, since the collimated laser beam has a small incident region on the hologram components 40*a* to 40*c*, the light intensity of the zeroth-order light increases accordingly. Therefore, from the viewpoint of weakening the light intensity of the zeroth-order light, it is preferable that incident light to the hologram components 40*a* to 40*c* be diffused light spreading slightly rather than perfect parallel light. When the diffused light is incident on the hologram components 40*a* to 40*c*, there is a possibility that the amount of blur in the region to be illuminated Z increases. As described in FIG. 3 and the like, in the case where the hologram components 40*a* to 40*c* are divided into a plurality of element holograms 45, and each element hologram 45 has such diffraction characteristics as to illuminate the entire region of the region to be illuminated Z, even if the incident light to the hologram components 40*a* to 40*c* is diffused light, probably the incident angle of the laser beam incident into each element hologram 45 is almost the same. Thus, the diffraction characteristics are designed so that the entire region of the region to be illuminated Z is illuminated for each element hologram 45, whereby it is possible to sharply illuminate the region to be illuminated Z as the whole of the hologram components 40*a* to 40*c*.

Figure 11:
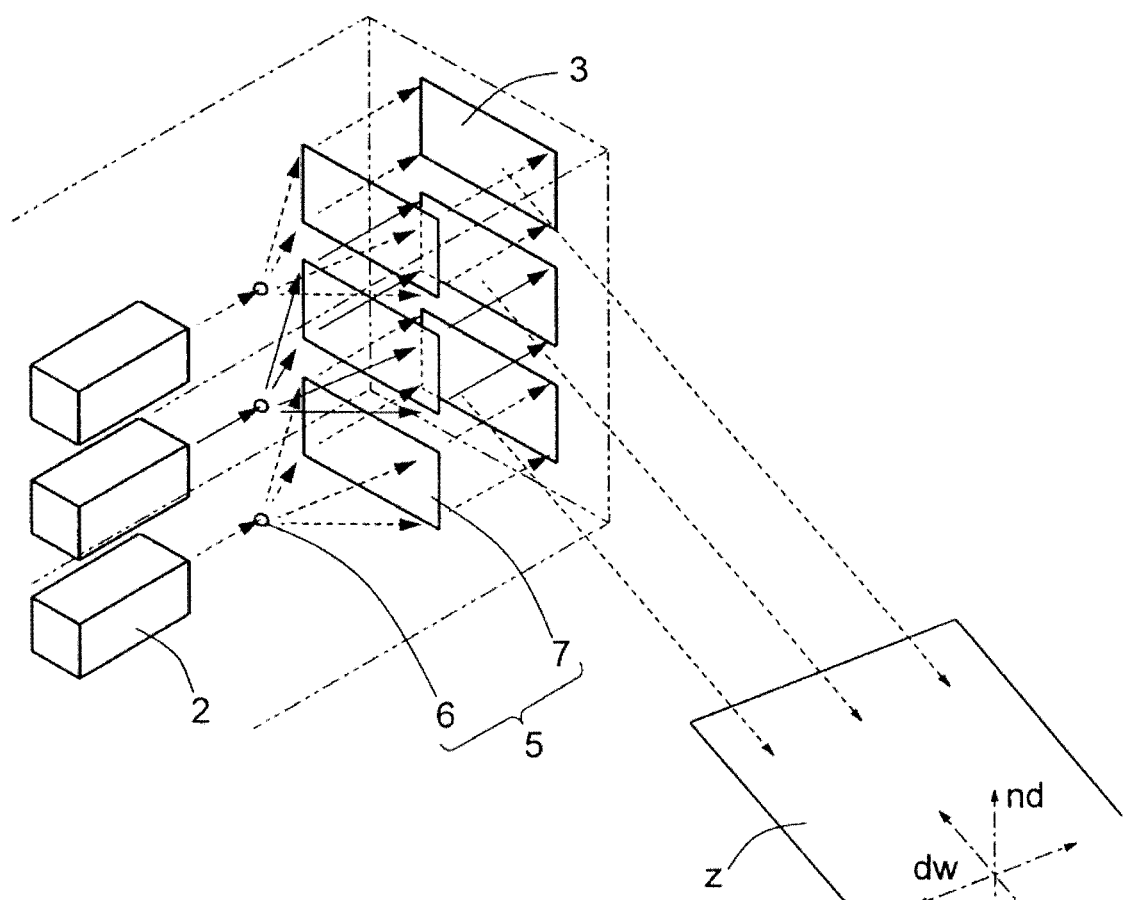
FIG. 11 is a perspective view of a lighting device having a reflection-type hologram component.

In FIG. 1 and the like, transmission-hologram components 40*a* to 40*c* are used as diffractive optical elements. Reflection-type hologram components 40*a* to 40*c* may be used as shown in FIG. 11. In the case of the reflection-type hologram components 40*a* to 40*c*, since the traveling direction of the zeroth-order light is different from the viewing direction by the observer, it is easy to take measures against the zeroth-order light.

In the above description, some modifications to the above-described embodiment have been described. Naturally, however, it is also possible to combine plural modifications as appropriate.

The invention claimed is:

1. A lighting device that illuminates a region to be illuminated extending in a first direction and extending in a second direction intersecting with the first direction, the lighting device comprising:
   a light source; and
   a diffractive optical element having a first hologram component and a second hologram component both of which diffract light from the light source and direct the light to the region to be illuminated,
   wherein an illumination range of diffracted light from the first hologram component is aligned with an illumination range of diffracted light from the second hologram component in at least one of the first direction and the second direction of the region to be illuminated,
   wherein the second hologram component includes a plurality of element holograms, and
   wherein diffracted light from at least two or more element holograms among the plurality of element holograms illuminates the entire region of the region to be illuminated.

2. The lighting device according to claim 1,
   wherein the first hologram component and the second hologram component are disposed in a direction intersecting with the first direction of the region to be illuminated and in a direction intersecting with a normal direction to a plane on which the region to be illuminated is formed, and
   wherein an illumination width along a second direction intersecting with the first direction of diffracted light from the first hologram component incident on a first position along the first direction of the region to be illuminated is identical to an illumination width along the second direction of diffracted light from the second hologram component incident on the first position.

3. The lighting device according to claim 1,
   wherein the first hologram component and the second hologram component are disposed in a direction intersecting with the first direction of the region to be illuminated and in a direction along a normal direction to a plane on which the region to be illuminated is formed,
   wherein an illumination length along the first direction of the diffracted light from the first hologram component incident on a second position in the second direction intersecting with the first direction of the region to be illuminated is identical to an illumination length along the first direction of diffracted light from the second hologram component incident on the second position, and
   wherein an illumination width along a second direction of diffracted light from the first hologram component incident on a first position in the first direction of the region to be illuminated is identical to an illumination width along the second direction of diffracted light from the second hologram component incident on the first position.

4. The lighting device according to claim 1,
   wherein the first hologram component includes a plurality of element holograms, and
   wherein diffracted light from at least two or more element holograms among the plurality of element holograms illuminates the entire region of the region to be illuminated.

5. The lighting device according to claim 4, wherein an illumination width along a second direction intersecting with the first direction of diffracted light from one element hologram incident on a first position in the first direction of the region to be illuminated is identical to an illumination width along the second direction of diffracted light from another element hologram incident on the first position.

6. The lighting device according to claim 4, wherein an illumination length along the first direction of diffracted light from one element hologram incident on a second position in the second direction intersecting with the first direction of the region to be illuminated is identical to an illumination length along the first direction of diffracted light from another element hologram component incident on the second position.

7. The lighting device according to claim 4,
   wherein the plurality of element holograms is disposed in a direction intersecting with the first direction of the region to be illuminated and in a direction intersecting with a normal direction to a plane on which the region to be illuminated is formed, and wherein an illumination width along a second direction intersecting with the first direction of diffracted light from one element hologram incident on a first position in the first direction of the region to be illuminated is identical to an illumination width along the second direction of diffracted light from another element hologram incident on the first position.

8. The lighting device according to claim 4, wherein the plurality of element hologram is disposed in a direction intersecting with the first direction of the region to be illuminated and in a direction along a normal direction to a plane on which the region to be illuminated is formed, wherein an illumination length along the first direction of the diffracted light from one element hologram incident on a second position in the second direction intersecting with the first direction of the region to be illuminated is identical to an illumination length along the first direction of diffracted light from another element hologram incident on the second position, and wherein an illumination width along a second direction of diffracted light from one element hologram incident on a first position in the first direction of the region to be illuminated is identical to an illumination width along the second direction of diffracted light from another element hologram incident on the first position.

9. The lighting device according to claim 1, wherein the light source includes a first coherent light source and a second coherent light source, and wherein the lighting device further includes a first shaping optical system for shaping light from the first coherent light source to direct the light to the first hologram component, and a second shaping optical system for shaping light from the second coherent light source to direct the light to the second hologram component.

10. The lighting device according to claim 1, wherein the diffractive optical element illuminates the region to be illuminated so that a center line extending in the first direction through a center position in a second direction intersecting with the first direction of the region to be illuminated, and a projection line projecting an illumination light beam extending in the first direction through the center position of the diffractive optical element onto the region to be illuminated are shifted.

11. The lighting device according to claim 1, wherein light emitted from the light source is coherent light, and wherein the diffractive optical element illuminates the region to be illuminated so that zeroth-order light which has transmitted through the diffractive optical element without being diffracted by the diffractive optical element among the coherent light incident on the diffractive optical element is incident on a farthest end rather than a nearest end in the first direction of the region to be illuminated.

12. The lighting device according to claim 1, wherein light emitted from the light source and incident on the diffractive optical element is diffused light spreading more than parallel light.

13. The lighting device according to claim 1, wherein an illumination width along a second direction intersecting with the first direction of diffracted light from the first hologram component incident on a first position in the first direction of the region to be illuminated is identical to an illumination width along the second direction of diffracted light from the second hologram component incident on the first position.

14. The lighting device according to claim 1, wherein an illumination length along the first direction of the diffracted light from the first hologram component incident on a second position in the second direction intersecting with the first direction of the region to be illuminated is identical to an illumination length along the first direction of diffracted light from the second hologram component incident on the second position along the second direction of the region to be illuminated.

15. The lighting device according to claim 1, wherein the diffracted light from the first hologram component illuminates an entire region of the region to be illuminated and the diffracted light from the second hologram component illuminates the entire region of the region to be illuminated.

* * * * *